United States Patent [19]

Roy et al.

[11] Patent Number: 4,785,531
[45] Date of Patent: Nov. 22, 1988

[54] HINGE ATTACHING APPARATUS AND JAW AND FEEDER ASSEMBLY THEREFOR

[75] Inventors: Armand E. Roy, Attleboro; Leo T. Roy, S. Attleboro, both of Mass.

[73] Assignee: Craft, Inc., Attleboro, Mass.

[21] Appl. No.: 113,667

[22] Filed: Oct. 23, 1987

[51] Int. Cl.[4] ............................................. B23P 19/04
[52] U.S. Cl. .......................................... 29/798; 29/11; 29/434; 29/809; 198/421; 414/131
[58] Field of Search ................... 29/11, 434, 798, 809; 198/421; 414/131

[56] References Cited

U.S. PATENT DOCUMENTS

| | | | |
|---|---|---|---|
| 3,470,599 | 10/1969 | Burman et al. | 29/434 X |
| 3,930,808 | 1/1976 | Miller et al. | 29/809 |
| 4,349,942 | 9/1982 | Roy | 16/356 X |
| 4,603,454 | 8/1986 | Janssen, Jr. et al. | 29/11 |

Primary Examiner—P. W. Echols
Assistant Examiner—Andrew E. Rawlins
Attorney, Agent, or Firm—Salter & Michaelson

[57] ABSTRACT

An automated apparatus is operative for attaching sequential hinges, such as easel hinges having rosette fastening elements thereon, to sequential pairs of first and second substantially flat, penetrable members, in order to hingeably connect the penetrable members together. The apparatus includes a jaw assembly, a feeder assembly for feeding sequential hinges to the jaw assembly, a jaw advancement assembly for advancing the jaw assembly to a work station, first and second member advancement assemblies for advancing sequential pairs of first and second members, respectively, to the work station, a hammer assembly for urging the sequential pairs of first and second members into engagment with sequential hinges at the work station and a control assembly for controlling the jaw advancement assembly, the first and second member advancements assemblies and the hammer assembly.

14 Claims, 5 Drawing Sheets

HINGE ATTACHING APPARATUS AND JAW AND FEEDER ASSEMBLY THEREFOR

BACKGROUND AND SUMMARY OF THE INVENTION

The instant invention relates to automated assembly apparatus and more particularly to an automated apparatus for attaching hinges, such as easel hinges, to sequential pairs of first and second, substantially flat, penetrable members, such as the back and easel portions of frames for pictures and the like, in order to hingeably connect the first and second members together.

Easel hinges of the type disclosed in the U.S. patents to ROY, U.S. Pat. Nos. 3,994,045; 4,050,117; and 4,349,942, have been found to be highly effective for hingeably connecting pairs of first and second substantially flat, penetrable members together. In this connection, an easel hinge of this general type comprises first and second, substantially flat metal plate portions having first and second fastening elements thereon, respectively, and a barrel portion which hingeably connects the plate portions together. The fastening elements of a hinge of this type generally comprise rosette or star-type fastening elements which are receivable in piercing engagement with members made of penetrable materials, such as cardboard, for hingeably connecting the members together. Unfortunately, however, heretofore it has been necessary to assemble easel hinges of this type within first and second penetrable members in manual attaching operations, wherein first and second penetrable members are individually manually aligned with hinges and then pressed together so that the fastening elements of the finges piece the penetrable members in order to hingeably secure them together. As a result, the heretofore available procedures for securing easel hinges to pairs of first and second members have generally been relatively time consuming and therefore costly.

The instant invention provides an effective apparatus for attaching hinges, such as easel hinges of the above-described type, to sequential pairs of first and second, substantially flat, penetrable members, such as the back and easel portions of frames for pictures and the like. Specifically, the apparatus of the instant invention comprises feed means engageable with a hinge of the above-described type for feeding the hinge to a first station in a predetermined collapsed orientation, wherein the first and second plate portions of the hinge overlay one another with the fastening elements thereof facing outwardly. The apparatus further comprises jaw means operable at the first station for releasably engaging the barrel portion of the hinge to releasably secure the hinge in the jaw means, means for advancing a substantially flat, first penetrable member to a predetermined position at a second station, means for advancing the jaw means to thereby advance the hinge to a predetermined position at the second station, means for advancing a substantially flat, second penetrable member to a predetermined position at the second station, and means for urging the first and second penetrable members toward the first and second plate portions, respectively, at the second station in order to secure the first and second members to the first and second plate portions, respectively, with the first and second fastening elements, respectively. The jaw means preferably comprises an elongated base member, a jaw plate mounted on the base member, a movable jaw member pivotably mounted on the base member and biased toward the jaw plate so that the jaw member is operative in combination with the jaw plate for releasably retaining the barrel portion of a hinge between the jaw member and the jaw plate. The jaw member preferably has an elongated notch formed therein which faces toward the jaw plate, the notch being dimensioned for receiving a portion of a hinge therein and being open at the opposite ends thereof, and the feed means is preferably operative for feeding a hinge to the jaw means so that the barrel portion of the hinge is advanced into the notch through one of the open ends thereof. The base member mounting means is preferably operative for mounting the base member so that it is longitudinally repositionable and pivotable about a base member pivot axis which is substantially parallel to a first penetrable member positioned at the second station, and the means for repositioning the jaw means is preferably operable for longitudinally repositioning the base member in the base member mounting means between a retracted position and an extended position in order to advance a hinge to the second station. The jaw member is preferably formed with a cam surface thereon, and the jaw means preferably further comprises means engageable with the cam surface for pivoting the jaw member away from the jaw plate in order to more easily receive a hinge therein when the jaw member is moved to the retracted position thereof. The feed means is preferably operative for feeding a hinge to the jaw means when the base member is moved to the retracted position thereof, and the apparatus preferably further comprises control means which is responsive to the presence of a hinge received in the jaw means for actuating the jaw means advancing means, the first member advancing means the second member advancing means, and the means for urging the first and second members toward the first and second plate portions, respectively of the hinge. The means for advancing a second member to the second station is preferably operative for holding the second member in the appropriate predetermined position thereof at the second station until the first and second members have been urged toward the first and second plate portions, respectively, and it preferably includes a deflectable plate for supporting the second member until the force of the urging means moves the second member toward the first member to secure the first and second members to the first and second plate portions. The second member advancing means preferably further includes a pusher member for advancing the second member toward the second station, a stop member for preventing the advancement of the second member beyond the appropriate predetermined position thereof at the second station, and a resilient arm operative in a direction which is substantially perpendicular to the direction of movement of the pusher member for urging the second member toward the appropriate predetermined position thereof at the second station.

It has been found that the apparatus of the instant invention can be effectively utilized for rapidly securing sequential easel hinges to sequential pairs of first and second, substantially flat, penetrable members, such as the back and easel portions of frames for pictures and the like, in order to hingeably secure the pairs of penetrable members together. Specifically, the apparatus is operative for feeding sequential easel hinges to a first station and for rapidly advancing the hinges to a second station. The apparatus is also operative for rapidly advancing sequential pairs of first and second, substantially flat, penetrable members, such as the back and easel portions of frames for pictures and the like, to the second station so that the first and second members are properly aligned and oriented with respect to an easel hinge at the second station; and the apparatus is further operative for urging the first and second members toward the first and second plate portions of the easel hinge at the second station in order to secure the first and second members to the easel hinge with the first and second fastening elements on the hinge. As a result, the apparatus of the instant invention can be effectively utilized for hingeably securing the first and second members together in a high-speed, automated operation.

Accordingly, it is a primary object of the instant invention to provide an automated apparatus for hingeably securing a pair of first and second, substantially flat, penetrable members together with an easel hinge.

Another object of the instant invention is to provide an effective automated apparatus for hingeably securing the back and easel portions of frames for pictures and the like together with easel hinges.

An even further object of the instant invention is to provide an apparatus for minimizing the labor costs required for hingeably connecting the back and easel portions of frames for pictures and the like utilizing easel hinges.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
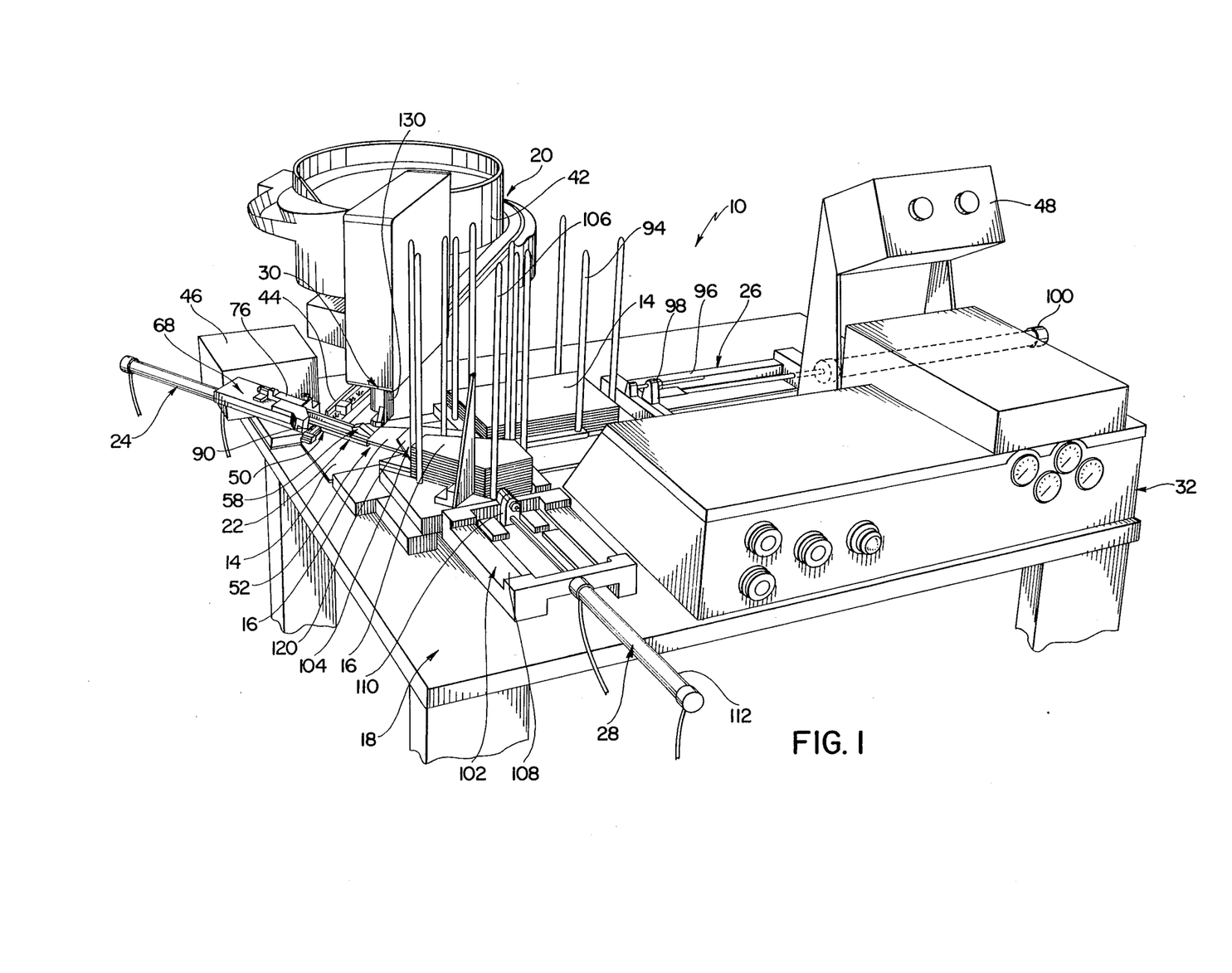
FIG. 1 is a perspective view of the apparatus of the instant invention.

Referring now to the drawings, the hinge attaching apparatus of the instant invention is illustrated and generally indicated at 10 in FIG. 1. The apparatus 10 is operative for performing an automated assembly process wherein hinges of the type illustrated in FIG. 1a and generally indicated at 12 are attached to first and second, substantially flat, penetrable members 14 and 16, respectively, in order to hingeably connect the members 14 and 16 together. The apparatus 10 is mounted on a base generally indicated at 18, and it comprises a feeder assembly generally indicated at 20, a jaw assembly generally indicated at 22, a jaw advancement assembly generally indicated at 24, a first member advancement assembly generally indicated at 26, and a second member advancement assembly generally indicated at 28. The apparatus 10 further comprises a hammer assembly generally indicated at 30, and a control assembly generally indicated at 32 which is operative for controlling the operations of the jaw advancement assembly 24, the first member advancement assembly 26, the second member advancement assembly 28 and the hammer assembly 30 in order to secure sequential hinges 12 to sequential pairs of first and second members 14 and 16 with the hammer assembly 30.

Figures 1A, 2:
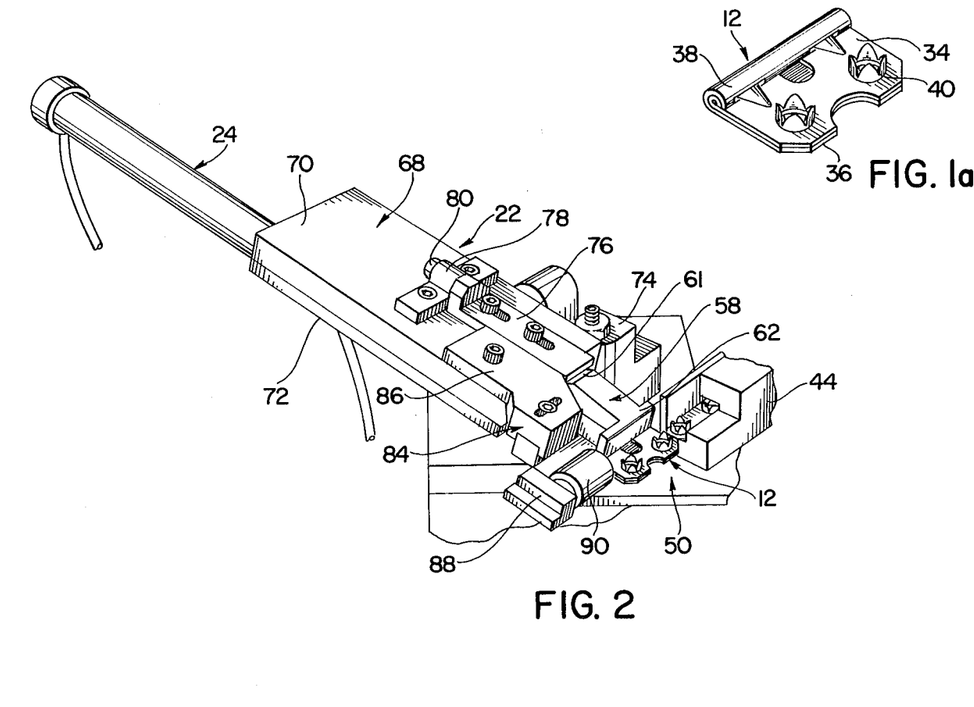
FIG. 2 is a perspective view of the jaw assembly of the apparatus.

Referring to FIG. 1a, the hinge 12 preferably comprises a hinge of the type disclosed in the U.S. Pat. No. 4,349,942, and it includes first and second plate portions 34 and 36, respectively, and a barrel portion 38 which hingeably connects the plate portions 34 and 36 together. The hinge 12 is positionable in a collapsed position illustrated in FIG. 1a, wherein the plate portions 34 and 36 overlay one another; and fastening elements 40 are integrally formed on the plate portions 34 and 36 and positioned thereon so that they face outwardly from the outwardly facing sides of the plate portions 34 and 36 when the hinge 12 is in the collapsed position thereof. The fastening elements 40 preferably comprise star or rosette-type fastening elements which are receivable in piercing engagement with penetrable members, such as those made of cardboard or the like, for securing the plate portions 34 and 36 thereto.

The first and second members 14 and 16 preferably comprise the back and easel portions, respectively, of frames for pictures and the like, respectively, and they are preferably formed in substantially flat, board-like configurations. The members 14 and 16 are preferably made from a suitable penetrable material, such as cardboard, to enable the members 14 and 16 to be penetrated by the rosettes 40 for securing the members 14 and 16 together with the hinges 12.

The base 18 preferably comprises a substantially flat, rigid, supporting table, and the feeder assembly 20, the jaw assembly 22, the jaw advancement assembly 24, the first member advancement assembly 26, the second member advancement assembly 28, the hammer assembly 30, and the control assembly 32, are preferably all mounted on the base 18 as illustrated in FIG. 1.

The feeder assembly 20 preferably comprises a conventional vibratory feeder assembly, and it includes a vibratory drum 42, a feeder track 44, a positive advancement mechanism 46, and a control 48. The feeder track 44 is adapted for use in combination with the hinges 12, and the feeder drum 42 is operative for receiving hinges 12 and for advancing them in an aligned row along the track 44. The positive advancement mechanism 46 is of conventional construction, and it comprises a motor drive (not shown), a slip clutch (not shown) on the motor drive, and an advancement finger (not shown), which is driven by the motor drive through the slip clutch. The advancement finger of the advancement mechanism 46 is operative for positively engaging sequential hinges 12 in order to advance them to a first station generally indicated at 50; although because the advancement finger is driven through a slip clutch, the hinges 12 can only be advanced to the first station 50 at times when they can be accepted by the jaw assembly 22, as will hereinafter be more fully set forth. The control 48 is operative for controlling the operation of the vibratory feeder assembly 20, including the positive advancement mechanism 46, in a conventional manner.

Figures 3, 4, 5:
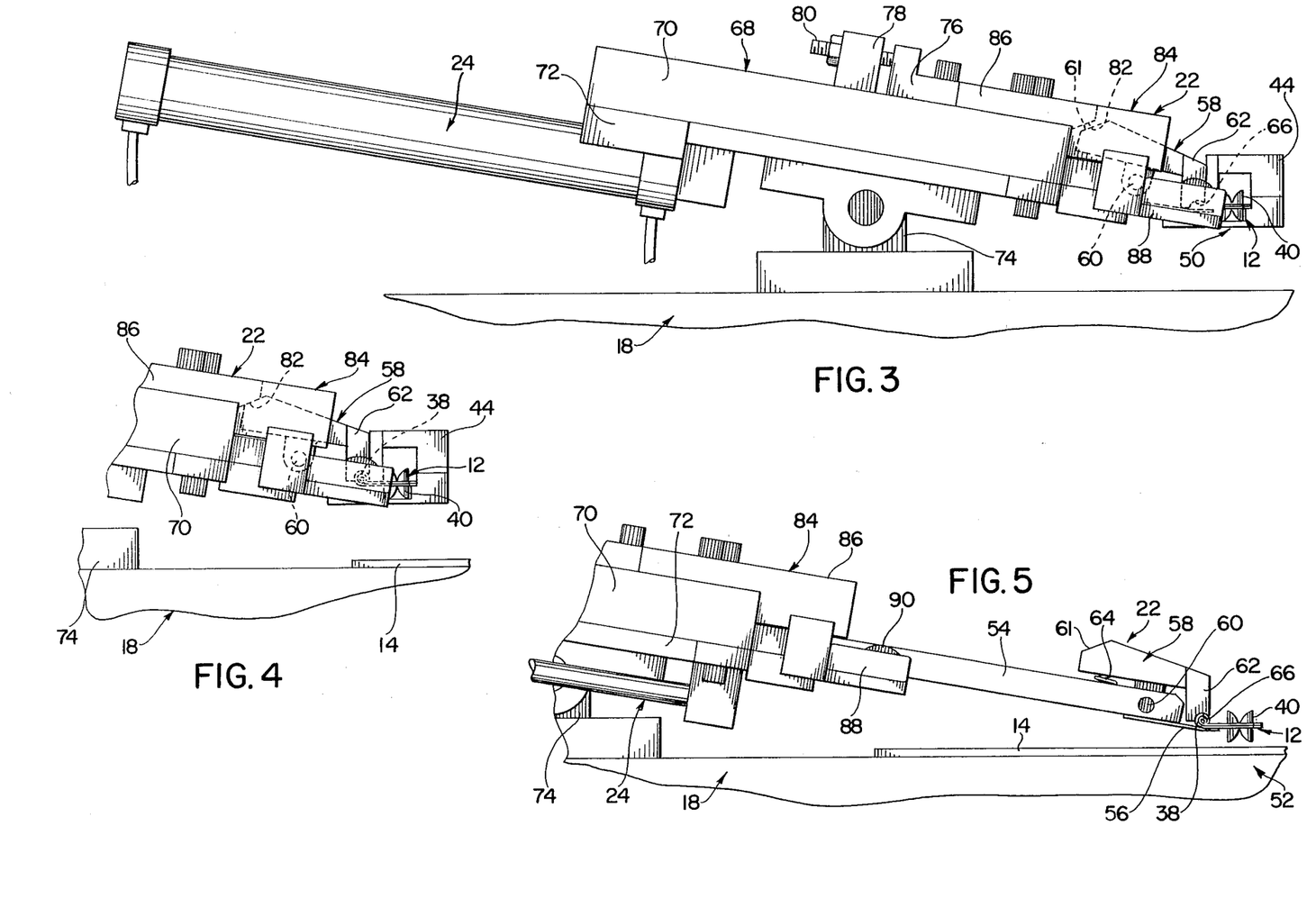
FIGS. 3-10 are sequential, side elevational views illustrating the operation of the jaw assembly.

The jaw assembly 22 is operative for sequentially receiving individual hinges 12 from the track 44 of the feeder assembly 20, and for releasably engaging the barrel portions 38 thereof to releasably secure the individual hinges 12 in the jaw assembly 22. The jaw assembly 22 is further operative for individually retaining sequential hinges 12 in a predetermined position while the jaw assembly 22 is advanced to a second station generally indicated at 52 with the jaw advancement assembly 24 so that the sequential hinges 12 can be individually assembled with sequential pairs of first and second elements 14 and 16, respectively, at the second station 52. The jaw assembly 22 comprises an elongated base member 54, a resilient jaw plate 56 which extends outwardly from the underside of the base member 54 and a jaw member 58. The jaw member 58 is pivotably attached to the base member 54 along an axis defined by a pivot pin 60, and it is formed with a rearwardly facing beveled camming surface 61 thereon. The jaw member 58 further includes an end portion 62 which extends downwardly beyond the terminal end of the base member 54 toward the resilient jaw plate 56. The jaw member 58 is biased to a position wherein the end portion 62 is pivoted toward the resilient jaw plate 56 with a spring 64, and an elongated notch 66 is formed in the end portion 62 so that it faces toward the jaw plate 56 and extends in a direction which is substantially parallel to the axis of the pivot pin 60. The jaw member 58 and the jaw plate 56 are adapted for receiving the barrel portions 38 of sequential hinges 12 therebetween with the barrel portions 38 received in the notch 66 and with the end portion 62 of the jaw member 58 in biased engagement with the barrel portions 38 of the hinges 12 to releasably secure the hinges 12 in the jaw assembly 22. The jaw assembly 22 further comprises a mounting block generally indicated at 68 comprising an upper plate 70, a lower plate 72, and a pivot mount 74. The upper and lower plates 70 and 72, respectively are formed so that they define an elongated passage therebetween, and the base member 54 is slidably received in the passage in the mounting block 68 so that it is longitudinally repositionable therein. More specifically, the base member 54 is longitudinally repositionable in the passage in the mounting block 68 between a retracted position wherein a hinge 12 received in the jaw assembly 22 is positioned at the first station 50, and an extended position wherein a hinge 12 received in the jaw assembly 22 is positioned at the second station 52. The mounting block 68 further includes a longitudinally adjustable cam plate 76 which is mounted on the upper surface of the upper plate 70, and an adjustment mechanism 78 including an adjustment screw 80 which is also mounted on the upper plate 70. The cam plate 76 is positioned so that it extends to a point adjacent the outer end of the mounting block 68, and the adjustment assembly 78 is positioned so that it is engageable with the cam plate 76 for adjusting the position thereof on the upper plate 70. As illustrated in FIGS. 3 and 4, the cam plate 76 is formed with a beveled outer end 82 thereon, which is engageable with the cam surface 61 of the jaw member 58 for pivoting the jaw member 58 against the force of the spring 64 to raise the end portion 62 upwardly slightly from the jaw plate 56 to enable the hinges 12 to be more easily received between the jaw member 58 and the jaw plate 56. The adjustment assembly 78 is operative for adjusting the longitudinal position of the cam plate 76 to adjust the operation of the cam plate 76 so that it only cams the jaw member 58 upwardly when the base member 54 is in the fully retracted position thereof. The base member 54 is formed with side portions 83, one of which slides along the open end of the feeder track 44 as the base member 54 is moved between the extended and retracted positions thereof for preventing the next sequential hinge 12 at the end of the track 44 from being advanced until the base member 54 has been returned to the fully retracted position thereof. The mounting block 68 is pivotally mounted on the pivot mount 74 which is in turn secured to the base 18, the pivot mount 74 being operative for mounting the mounting block 68 so that the mounting block 68, the base member 54, the jaw member 58 and the jaw plate 56 are pivotable about an axis which is substantially parallel to a first member 14 received at the second station 52, as well as substantially parallel to the pivot pin 60.

The jaw assembly 22 still further comprises a hinge sensor assembly generally indicated at 84 comprising a mounting bracket 86, on which an adjustment bracket 88 is secured and a microswitch 90. The mounting bracket 86 is secured on the plate 70 and the adjustment bracket 88 is adjustably secured on the bracket 86 for adjustably repositioning the sensor 90 adjacent the jaw member 58. The sensor 90 preferably comprises a microswitch-type sensor, and it preferably includes a sensor button 92 illustrated in FIG. 11, which is engageable with the barrel portion 38 of a hinge 12 when the hinge 12 is received in the jaw assembly 22 for sensing the presence of a hinge 12 at the first station 50.

The advancement assembly 24 comprises a conventional pneumatic piston and cylinder, and it is attached to the jaw assembly mounting block 68 for moving the base member 54 between the extended and retracted positions thereof, wherein a hinge 12 received in the jaw assembly 22 is positioned at the second and first stations, respectively, 52 and 50, respectively.

The first member advancement assembly 26 comprises a conventional pneumatically operated magazine shuttle system, and it is operative for individually advancing the first members 14 to the second station 52 so that sequential first members 14 are properly oriented to be assembled with sequential hinges 12 and second members 16 at the station 52. The first member advancement assembly 26 includes a plurality of vertical alignment rods 94, which are operative for receiving and positioning a plurality of the first members 14 in a substantially aligned stack as illustrated in FIG. 1 so that they can be sequentially advanced to the second station 52. The first member advancement assembly 26 further comprises a frame 96 which is mounted on the base 18, a shuttle member 98, and a pneumatic piston assembly 100. The shuttle member 98 includes a bottom pusher plate (not shown) which is engageable with the lowermost first member 14 in the stack of first members 14 for advancing the lowermost first member 14 to the second station 52. The shuttle member 98 is adapted for traveling between a retracted position wherein the pusher plate thereof is retracted into the frame 96 and an extended position wherein the pusher plate thereof extends outwardly from the frame 96 for advancing a first member 14 to the second station 52. The pneumatic piston assembly 100 is of conventional constuction and it is operative for moving the shuttle member 98 between the retracted and extended positions thereof.

Figures 10, 11, 12:
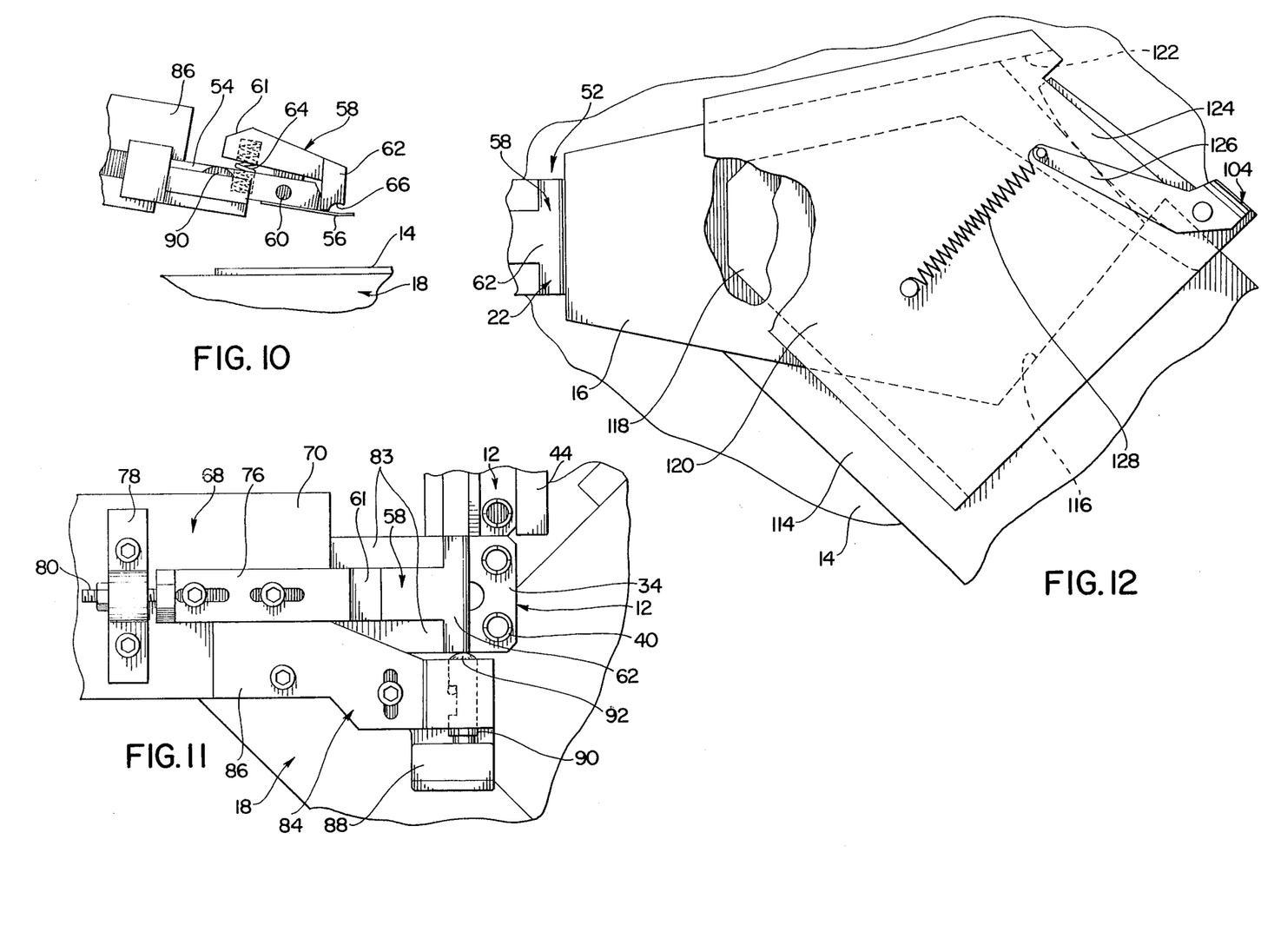
FIG. 11 is a top plan view of the jaw assembly in the retracted position with a hinge received therein.
FIG. 12 is a top plan view illustrating the operation of the second member advancement assembly at the second station.

The second member advancement assembly 28 comprises a conventional pneumatically operated magazine shuttle system generally indicated at 102, and a second member positioning assembly generally indicated at 104 in FIG. 12. The magazine shuttle system 102 comprises a frame 108, a shuttle member 110 and a conventional pneumatic piston assembly 112. The shuttle member 110 includes a pusher plate 114 (illustrated in FIG. 12) having a V-shaped end face 116, and it is mounted in the frame 108 so that it is movable between an extended position, wherein the pusher plate 114 extends outwardly from the frame 108 for advancing one of the second members 16 to the second member positioning assembly 104, and a retracted position wherein the pusher plate 114 is at least partially positioned within the frame 108. The shuttle member 110 is connected to the pneumatic piston assembly 112 for movement between the extended and retracted positions thereof. The second member advancement assembly 28 is operative for advancing sequential second members 16 to the second station 52 so that the second members 16 are positioned in slightly elevated relation relative to sequential first members 14 positioned at the second station 52; and hence, the advancement assembly 28 is adapted so that the pusher plate 114 travels in a slightly elevated plane relative to the plane of the sequential first members 14 positioned at the second station 52.

The second member positioning assembly 104 which is illustrated in FIG. 12 is operative for receiving sequential second members 16 from the second member shuttle system 102 and for positioning them in a predetermined position and orientation at the second station 52. The positioning assembly 104 comprises a resilient spatula member 118 which is mounted in slightly upwardly spaced relation to the upper surface of the base 18 at the second station 52, and an upper plate 120 which is mounted in slightly upwardly spaced relation to the spatula 118. The spatula 118 and the upper plate 120 are positioned for receiving sequential first members 16 therebetween as the pusher member 114 advances the second members 16 toward the second station 52. An end wall 122 extends downwardly from the top plate 120 to provide a stop for the sequential second members 16, and a positioning arm 124 is engageable with one of the angular bottom edges of each of the sequential second members 16 to urge the members 16 into proper orientation at the station 52. In this connection, the arm 124 is pivotably connected to the top plate 120, and a linking arm 126 is connected to the arm 124 for pivotal movement therewith. A spring 128 biases the connecting arm 126 to bias the positioning arm 124 so that it engages sequenial second members 16 as they are received in the positioning assembly 104.

The hammer assembly 30 comprises a conventional pneumatically operated hammer assembly, and it includes a pneumatic piston assembly (not shown) and a hammer element 130 which is driven by the piston assembly and operative at the second station 52 for engaging sequential second members 16 in order to urge them downwardly toward the base 18. Accordingly, the hammer assembly 30 cooperates with the base 18 for urging sequential pairs of first and second members 14 and 16, respectively, together so that the rosette fastening elements 40 on sequential hinges 12 interposed therebetween at the second station 52 penetrate the first and second members 14 and 16 to hingeably secure them together with the hinges 12.

The control assembly 32 is mounted on the base 18, and it comprises a conventional cam-actuated pneumatic control. The control assembly 32 is connected to the microswitch 90 for detecting the presence of individual hinges 12 in the jaw assembly 22 at the first station 50, and it is responsive thereto for operating the first member advancement assembly 26, the jaw advancement assembly 24, and the second member advancement assembly 28 for positioning a first member 14, a hinge 12, and a second member 16, respectively, at the second station 52. Further, after the first member advancement assembly 26, the jaw advancement assembly 24 and the second member advancement assembly 28 have been operated to position the appropriate elements at the second station 52, the control assembly 32 is operative for controlling the hammer assembly 30 to lower the hammer element 130 so that it engages the second member 16 at the second station 52 in order to urge the first and second members 14 and 16, respectively, together and to thereby cause the rosettes 40 on the hinge 12 at the second station 52 to penetrate the first and second members 14 and 16, respectively, to secure the hinge 12 thereto. After the first and second members 14 and 16, respectively, have been secured to the hinge 12 at the second station 52 in this manner, the control assembly 32 is operative for controlling the hammer assembly 30 to retract the hammer element 130. The control assembly 32 is then operative for controlling the jaw advancement assembly to retract the jaw assembly 22 so that the end member 62 is cammed upwardly by the barrel portion 36 of the hinge 12 at the second station 52 to disengage the jaw assembly 22 from the hinge 12; and once the jaw assembly 22 has been returned to the first station 50 so that the notch 66 is aligned with the feeder track 44, a new hinge 12 is automatically advanced into the jaw assembly 22 by the feeder assembly 20. As soon as a new hinge 12 has been fully positioned in the jaw assembly 22 so that it engages the sensor 90, the control assembly 32 is actuated for commencing a new cycle to assemble the next sequential pair of first and second embers 14 and 16, respectively, in the advancement assemblies 26 and 28, respectively, with the new hinge 12 in the jaw assembly 22. In this connection, as the next sequential first member 14 is advanced to the second station 52, it normally engages the completed assembly at the second station 52 so that the completed assembly is removed from the second station 52 by the advancement of the new first member 14.

Figure 6:
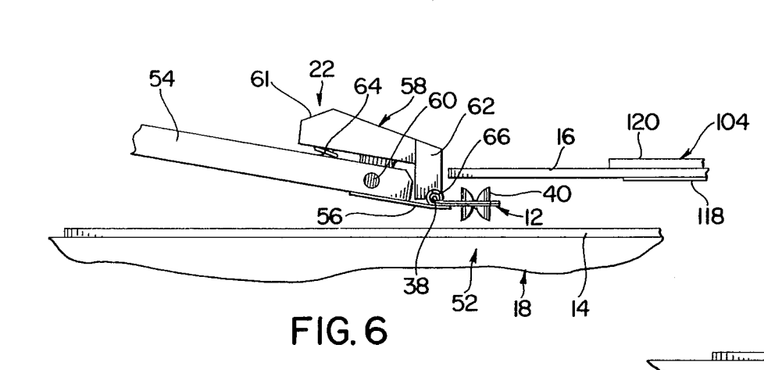
Figure 7:
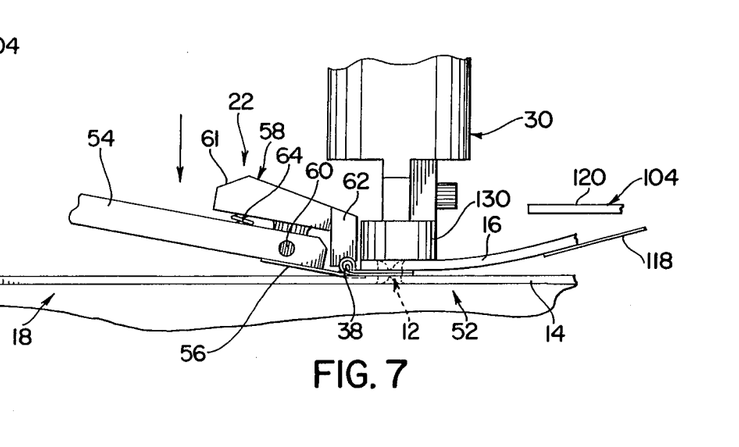
Figure 8:
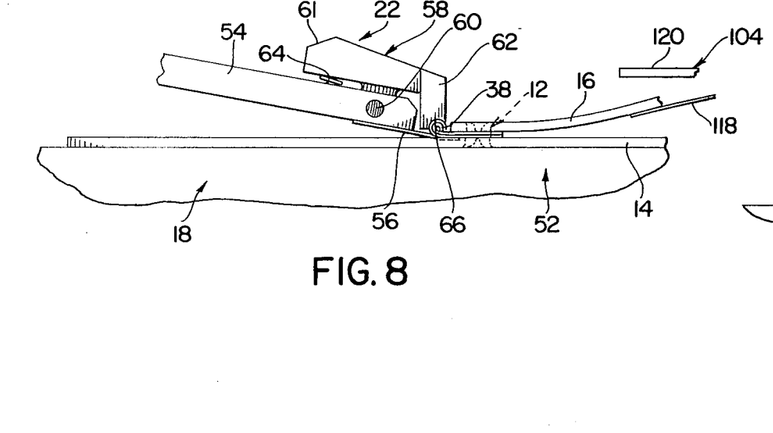
Figure 9:
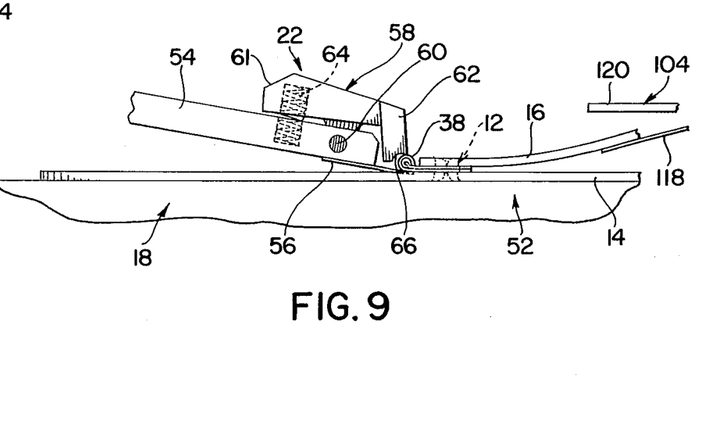

The operation of the jaw assembly 22 as a hinge 12 is received therein and then advanced and held in a predetermined position at the second station 52 is illustrated in FIGS. 3-9. As will be seen, as the base member 54 is moved to the fully retracted position thereof, the cam surface 61 of the jaw member 58 engages the beveled outer end 82 of the cam plate 76 to pivot the jaw member 58 to a slightly open position. Further, once the base member 54 has been fully retracted, the notch 66 in the end portion 62 is aligned with the barrel portion 38 of the adjacent hinge 12 in the feeder track 54 so that the hinge 12 is advanced into the notch 66 and positioned between the jaw member 58 and the jaw plate 56. When the hinge 12 engages the sensor 90, the jaw advancement assembly 24 is actuated to move the jaw member 58, the jaw plate 56 and the hinge 12 therebetween forwardly to position the hinge 12 at the second station 52. As soon as the base member 54 has been moved forwardly so that the jaw member 58 is disengaged from the cam plate 76, the jaw member 58 firmly grasps the hinge 12 so that it is held in a predetermined outwardly extending position as it is moved to the second station 52. Further, the jaw assembly 22 is constructed so that when the base member 54 is moved to an extended position to locate the hinge 12 at the second station 52, the hinge 12 is normally disposed in slightly upwardly spaced relation to the first member 14 at the second station 52; and the jaw assembly 22 is normally maintained in this position by the weight of the jaw advancement assembly 24. Further, the second member positioning assembly 104 is constructed so that a second member 16 positioned at the second station 52 is disposed in slightly upwardly spaced relation to the hinge 12 at the second station 52, as illustrated in FIG. 6. However, the jaw assembly 22 is constructed so that when the hammer element 130 descends to secure the hinge 12 to the first and second members 14 and 16, respectively, the force of the hammer element 130 counteracts the weight of the advancement assembly 24 and causes mounting block 68 to pivot in the pivot mount 74 to enable the base member 54, the jaw member 58 and the jaw plate 56 to be pivoted downwardly toward the base 18 as the rosettes 40 on the hinge 12 penetrate the first member 14 and the second member 16. Further, the spatula 118 is constructed so that it is downwardly deflectable to enable the second member 16 to be moved downwardly to an assembled position with the hinge 12 and the first member 14 as illustrated in FIGS. 7-9. In any event, thereafter, as the hinge advancement assembly 24 is operated to retract the base member 54, the jaw member 58 and the jaw plate 56 are pulled away from the barrel portion 38 of the hinge 12 so that the jaw assembly 22 is disengaged from the hinge 12.

It is seen therefore that the instant invention provides an effective apparatus for securing sequential hinges to sequential first and second substantially flat members, such as the members 14 and 16, respectively. The apparatus 10 is operative for attaching sequential hinges 12 to sequential pairs of first and second members 14 and 16 in rapid succession for effectively carrying out a process which heretofore required a series of tedious and time consuming manual alignment operations. Accordingly, for these reasons as well as the other reasons as hereinabove set forth, it is seen that the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. An apparatus for attaching a hinge to first and second, substantially flat penetrable members in order to hingeably connect said members, said hinge comprising first and second, substantially flat plate portions having first and second fastening elements thereon, respectively, and a barrel portion hingeably connecting said plate portions, said first and second fastening elements being receivable in piercing engagement with said first and second members for securing said first and second plate portions thereto, respectively, said hinge being receivable in a collapsed disposition wherein said first and second plate portions overlay one another with said fastening elements facing outwardly, said apparatus comprising feed means for feeding said hinge in said collapsed disposition and in a predetermined orientation to a first station, jaw means operable at said first station for releasably engaging said barrel portion to releasably secure said hinge in said jaw means, means for advancing said first member to a predetermined position at a second station, means for advancing said jaw means to advance said hinge to a predetermined position at said second station, wherein said first fastening element is engageable with said first member, means for advancing said second member to a predetermined position at said second station wherein said second fastening element is engageable with said second member, and means for urging said first and second members toward said first and second plate portions, respectively, to secure said first and second members to said first and second plate portions, respectively, with said first and second fastening elements, respectively.

2. In the apparatus of claim 1, said jaw means comprising a jaw plate and a movable jaw member biased toward said jaw plate and operative in combination therewith for releasably retaining said barrel portion between said jaw member and said jaw plate.

3. In the apparatus of claim 2, said jaw member being pivotably movable toward and away from said jaw plate about a jaw pivot axis.

4. In the apparatus of claim 3, said jaw member having an elongated notch formed therein, said notch facing toward said jaw plate and being dimensioned for receiving said barrel portion therein.

5. In the apparatus of claim 4, said notch having an open end, said feed means being operative for feeding said hinge to said jaw means so that the barrel portions of said hinge is advanced into said notch through said open end.

6. In the apparatus of claim 3, said jaw means further comprising an elongated base member, said jaw member being pivotably mounted on said base member, and means for mounting said base member so that it is longitudinally repositionable and pivotable about a base member pivot axis which is substantially parallel to said first member when said first member is in said predetermined position thereof at said second station, said jaw means advancing means longitudinally repositioning said base member in said base member mounting means for advancing said hinge to said second station.

7. In the apparatus of claim 6, said jaw means base member being longitudinally repositionable between a retracted position and an extended position, said jaw means further comprising means for pivoting said jaw member away from said jaw plate to enable said hinge to be received therein when said jaw member is in said retraction position.

8. In the apparatus of claim 7, said jaw member having a cam surface thereon, said means for pivoting said jaw member engaging said cam surface to pivot said jaw member when said base member is moved to the retracted position thereof.

9. In the apparatus of claim 8, said feed means feeding said hinge to said jaw means when said base member is moved to the retracted position thereof.

10. The apparatus of claim 1 further comprising control means responsive to the presence of a hinge in said jaw means for actuating said jaw means advancing means, said second member advancing means and said means for urging said first and second members.

11. In the apparatus of claim 1, said second member advancing means being operative for holding said second member in said predetermined position thereof until said first and second members are urged toward said first and second plates, respectively, with said means for urging said first and second members.

12. In the apparatus of claim 11, said second member being in spaced, substantially parallel relation to said first member when said first and second members are in the respective predetermined positions thereof.

13. In the apparatus of claim 12, said second member advancing means including a delfectable plate for maintaining said second member in said predetermined position thereof, said deflectable plate being resiliently deflectable by the force of said urging means when said urging means is actuated to urge said first and second members towards said first and second plate portions of said hinge, respectively.

14. In the apparatus of claim 11, said second member advancing means including a pusher member for advancing said second member in a predetermined direction toward said predetermined position thereof, a stop member for preventing the advancement of said second member beyond said predetermined position thereof, and a resilient arm operative in a direction which is substantially perpendicular to said predetermined direction for urging said second member toward said predetermined position thereof.

* * * * *